(12) United States Patent
Henley et al.

(10) Patent No.: US 12,170,438 B2
(45) Date of Patent: Dec. 17, 2024

(54) CONDUIT FITTINGS FOR CONDUIT AND CABLE INSTALLATIONS

(71) Applicant: Robroy Industries—Texas, LLC, Gilmer, TX (US)

(72) Inventors: Christopher Robert Henley, Dallas, GA (US); Steven A. Voelzke, Longview, TX (US); Tabitha Stricklin, Forney, TX (US)

(73) Assignee: Robroy Industries—Texas, LLC, Gilmer, TX (US)

( * ) Notice: Subject to any disclaimer, the term of this patent is extended or adjusted under 35 U.S.C. 154(b) by 0 days.

(21) Appl. No.: 17/978,416

(22) Filed: Nov. 1, 2022

(65) Prior Publication Data

US 2023/0134178 A1 May 4, 2023

Related U.S. Application Data

(60) Provisional application No. 63/274,241, filed on Nov. 1, 2021.

(51) Int. Cl.
*H02G 3/04* (2006.01)

(52) U.S. Cl.
CPC ......... *H02G 3/0481* (2013.01); *H02G 3/0418* (2013.01)

(58) Field of Classification Search
None
See application file for complete search history.

(56) References Cited

U.S. PATENT DOCUMENTS

| 7,057,104 | B1 * | 6/2006 | McCleskey | H02G 3/06 174/505 |
| 7,582,835 | B2 | 9/2009 | Pyron | |
| 8,867,235 | B2 | 10/2014 | Veillette | |
| 9,029,715 | B1 * | 5/2015 | Baldwin | H02G 3/081 174/480 |
| 11,381,064 | B2 * | 7/2022 | Wilson, Sr. | H02G 3/0418 |
| 11,744,494 | B2 * | 9/2023 | Rogers | A61B 5/15003 600/573 |
| 2003/0159846 | A1 * | 8/2003 | Takahashi | H02G 3/0608 174/68.3 |
| 2008/0236862 | A1 * | 10/2008 | Elder | H02G 3/081 174/87 |
| 2009/0056971 | A1 * | 3/2009 | Pyron | H02G 3/081 174/68.1 |
| 2009/0223958 | A1 * | 9/2009 | Pyron | H02G 3/06 220/241 |

(Continued)

OTHER PUBLICATIONS

ISR/WO issued in PCT/US2022048554 on Mar. 8, 2023.

*Primary Examiner* — Krystal Robinson
(74) *Attorney, Agent, or Firm* — The Webb Law Firm (57) ABSTRACT

A conduit body includes a sidewall defining an internal chamber and at least two ports providing access to the internal chamber, and a cover connectable to the sidewall to enclose the internal chamber. The sidewall defines a first surface section adjacent one of the at least two ports, a second surface section adjacent another of the at least two ports, and a radiused transition section connecting the first surface section and the second surface section and configured for reducing frictional drag of a cable pulled though the internal chamber. The first surface section is spaced apart from the second surface section to increase a volume of the internal chamber.

15 Claims, 9 Drawing Sheets

(56) References Cited

U.S. PATENT DOCUMENTS

| | | | |
|---|---|---|---|
| 2009/0314512 A1* | 12/2009 | Bing | H02G 3/081 |
| | | | 174/68.3 |
| 2011/0120582 A1* | 5/2011 | Veillette | H02G 3/086 |
| | | | 138/109 |
| 2019/0288494 A1* | 9/2019 | Morse | H02G 3/0481 |
| 2023/0134178 A1* | 5/2023 | Henley | H02G 3/0481 |
| | | | 174/68.1 |

\* cited by examiner

CONDUIT FITTINGS FOR CONDUIT AND CABLE INSTALLATIONS

CROSS-REFERENCE TO RELATED APPLICATIONS

This application claims the benefit of U.S. Provisional Patent Application No. 63/274,241, filed on Nov. 1, 2021, the disclosure of which is hereby incorporated by reference in its entirety.

BACKGROUND OF THE INVENTION

Field of the Invention

The present disclosure relates to conduit bodies for conduit and cable installations, and more particularly to conduit bodies with features to ease cable routing and pulling, and to conduit bodies with features to facilitate drainage.

Description of Related Art

Conduit is a well-known protective covering and routing path for use with electrical wire and cable in both industrial, commercial, and residential applications. Electrical installations utilizing conduit typically include lengths of conduit connected by various types of fittings. Conduit is offered in a variety of metal, plastic, and composite materials, and is selected based on the needs of a particular application. A multitude of governing bodies promulgate regulations requiring that conduit used in specific applications meets certain minimum requirements. For example, in certain applications, metal conduit and conduit fittings must maintain a minimum level of sterility to prevent corrosion, contamination and bacteria growth thereon.

Cables and/or wires are installed in the conduit by pulling the cables/wires through the run of connected conduits and fittings. Significant force may be required to pull the wire/cable through the conduit run, depending on the inner diameter of the conduit, the number and size of wires, the number and size of bends in the conduit, and the use of pulling lubricant. If the required pulling force is too great to practically pull the cable/wire through the entire run of conduit, conduit bodies with access covers may be installed in the conduit run to allow the cable/wire to be pulled through the conduit run in multiple sections. Some industry regulations require or recommend such conduit bodies be installed after a predetermined number of bends in the conduit run. To install the cable/wire, a leading end of the cable/wire is pulled through the conduit run until the leading end enters the conduit body. A desired amount of the cable/wire is pulled out of the access opening of the conduit body, and then the leading end of the cable/wire is reinserted into the conduit body and pulled through the next section of the conduit run.

Conventional conduit bodies, while allowing the cable/wire to be pulled through in sections, still have limitations. First, the cable/wire tends to drag along the inner wall of the conduit fitting when pulled taut, which causes friction. Second, when the leading end of the cable/wire is reinserted into the conduit body and the slack cable is pulled through the next section of conduit, the cable/wire is forced into a tight bend as the last of the slack re-enters the conduit body. A significant amount of force may be required to pull this last bit of slack cable into the conduit body. In some instances, installers will address these issues by simply using a larger trade size conduit than would otherwise be required in order to provide additional room for placement and bending of the cable/wire. While this may ostensibly reduce the pull force required for installation, the use of lager fittings, conduit bodies, and conduit runs adds expense and size that would otherwise not be required by regulatory codes/standards.

Conventional conduit bodies also tend to become collection points for water that inadvertently enters the conduit run. The presence of water near or in contact with the cable/wire may be dangerous and run afoul of industry regulations. Additionally, water may corrode various components of the conduit, fittings, and/or cable/wire.

In view of the foregoing, there exists a need for conduit bodies designed for easier pulling of cable, and for conduit bodies with features for extracting water.

SUMMARY

Embodiments of the present disclosure are directed to conduit bodies for use in conduit and cable installations. Some embodiments of the present disclosure are directed to a conduit body including a sidewall defining an internal chamber and at least two ports providing access to the internal chamber, and a cover connectable to the sidewall to enclose the internal chamber. The sidewall defines a first surface section adjacent one of the at least two ports, a second surface section adjacent another of the at least two ports, and a radiused transition section connecting the first surface section and the second surface section and configured for reducing frictional drag of a cable pulled though the internal chamber. The first surface section is spaced apart from the second surface section to increase a volume of the internal chamber.

In some embodiments, a distance between the first surface section and the second surface section dictates a bend radius of the cable in the internal chamber.

In some embodiments, the conduit body further includes a gasket between the sidewall and the cover.

In some embodiments, the at least two ports are arranged at approximately 90° relative to one another.

In some embodiments, the cover is located on an opposite side of the internal chamber relative to one of the at least two ports.

In some embodiments, the cover is located on a side of the conduit body parallel to a plane extending through the at least two ports.

In some embodiments, the conduit body further includes a drain port in fluid communication with the internal chamber.

In some embodiments, the conduit body further includes a drain fitting connected to the drain port.

In some embodiments, the drain fitting includes a plug or a valve.

In some embodiments, the drain port is oriented approximately perpendicular to one of the at least two ports.

In some embodiments, the drain port is located at a lowest point of the internal chamber.

In some embodiments, the cover is connectable to the sidewall by three fasteners.

In some embodiments, each of the three fasteners is adjacent to one of the ports.

In some embodiments, the at least two ports include three ports.

In some embodiments, two of the three ports are coaxial to one another, and a third of the three ports extends at approximately 90° relative to the other two ports.

Other embodiments of the present disclosure are directed to a conduit body including a sidewall defining an internal chamber and at least two ports providing access to the internal chamber, a cover connectable to the sidewall to enclose the internal chamber, a drain port in fluid communication with the internal chamber.

In some embodiments, the conduit body further includes a drain fitting connected to the drain port.

In some embodiments, the drain fitting includes a plug or a valve.

In some embodiments, the drain port is oriented approximately perpendicular to one of the at least two ports.

In some embodiments, the drain port is located at a lowest point of the internal chamber.

Further details and advantages of the various examples described in detail herein will become clear upon reviewing the following detailed description of the various examples in conjunction with the accompanying drawing figures.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

The following description is provided to enable those skilled in the art to make and use the described aspects contemplated for carrying out the disclosure. Various modifications, equivalents, variations, and alternatives, however, will remain readily apparent to those skilled in the art. Any and all such modifications, variations, equivalents, and alternatives are intended to fall within the spirit and scope of the present disclosure.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

All numbers used in the specification and claims are to be understood as being modified in all instances by the term "about". The terms "approximately", "about", and "substantially" mean a range of plus or minus ten percent of the stated value. Further, the term "substantially equal" and like terms mean that the compared values or dimensions are within a range of plus or minus ten percent of one another.

The terms "first", "second", and the like are not intended to refer to any particular order or chronology, but refer to different conditions, properties, or elements.

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C.

Embodiments of the present disclosure are generally directed to conduit bodies with features to ease the installation of cable through the conduit body and other sections of a conduit run. In some embodiments, the conduit bodies include an internal chamber having a shape and volume configured to ease cable installation. In some embodiments, the conduit bodies include relatively large edge radiuses to facilitate smooth pulling of cable.

Additionally, embodiments of the present disclosure are directed to conduit bodies including features for draining water accumulated in the conduit bodies or other portions of the conduit run.

Referring now to FIGS. 1-4, a conduit body 100 is illustrated in accordance with an embodiment of the present disclosure. The conduit body 100 includes a sidewall 102 defining an internal chamber 110 which houses one or more cables 90 (see FIG. 4). The sidewall 102 further defines (or is connected to) two ports 104, 106, which provide access to the internal chamber 110 for the cable 90 to be installed. The ports 104, 106 in the illustrated embodiment are arranged at approximately 90° relative to one another, though in other embodiments the ports 104, 106 could be provided at another angle or could be arranged coaxially relative to one another. Each of the ports 104, 106 is configured to receive a conduit through which cable 90 (see FIG. 4) is fed into or out of the internal chamber 110. Each of the ports 104, 106 may include an NPT thread or other industry standard interface for connecting to the conduit.

The conduit body 100 further includes a cover 120 which removably connects to the sidewall 102 via fasteners 122, e.g. screws, received by threaded holes 124 in the sidewall 102. The cover 120, along with the sidewall 102, encloses the internal chamber 110. The cover 120 is located on an opposite side of the internal chamber 110 relative to the port 106. In some embodiments, a gasket may be provided between the sidewall 102 and the cover 120 to provide a fluid-tight and/or air-tight seal isolating the internal chamber 110 from the external atmosphere surrounding the conduit body 100.

Figure 1:
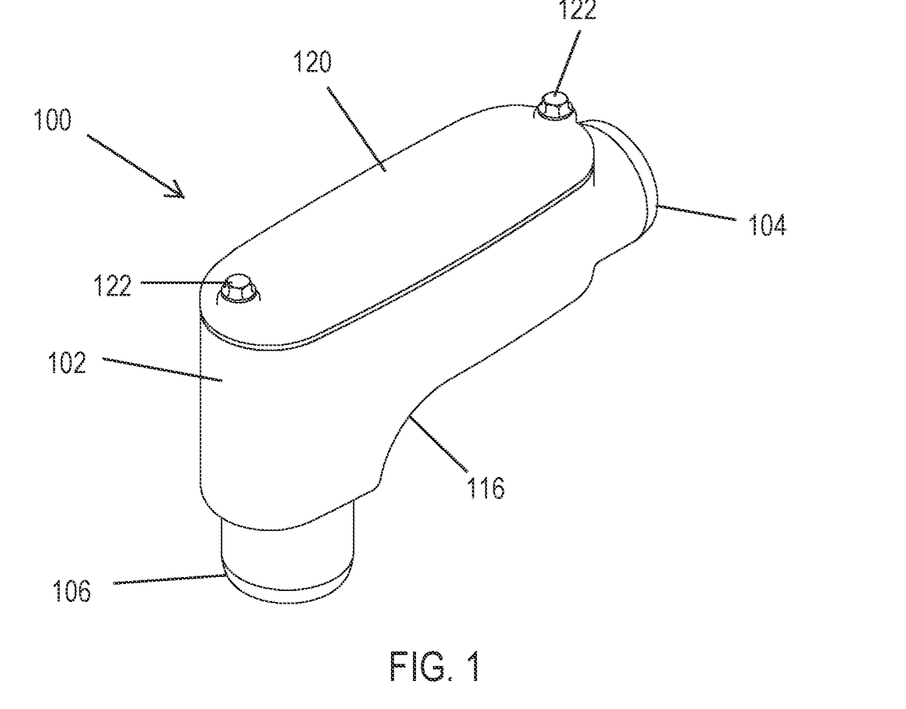
FIG. 1 is a perspective view of a conduit body in accordance with an embodiment of the present disclosure.
Figure 2:
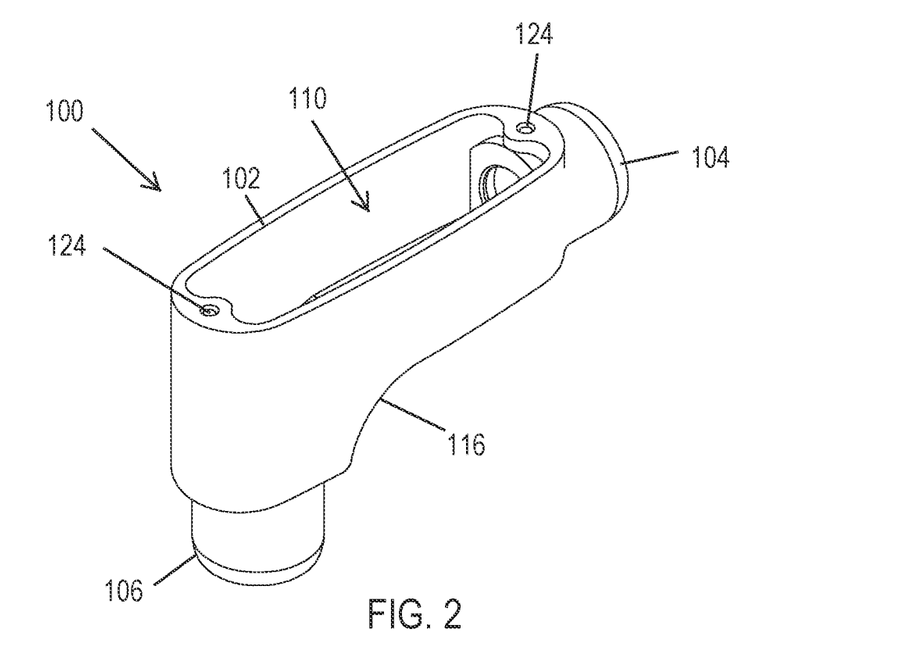
FIG. 2 is a perspective view of the conduit body of FIG. 1, with a cover thereof removed for clarity.
Figure 3:
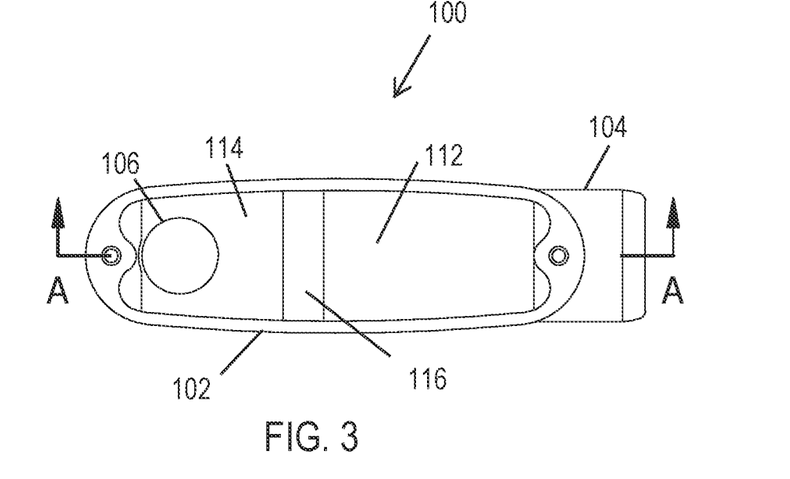
FIG. 3 is a top view of the conduit body of FIG. 1, with the cover thereof removed for clarity.
Figure 4:
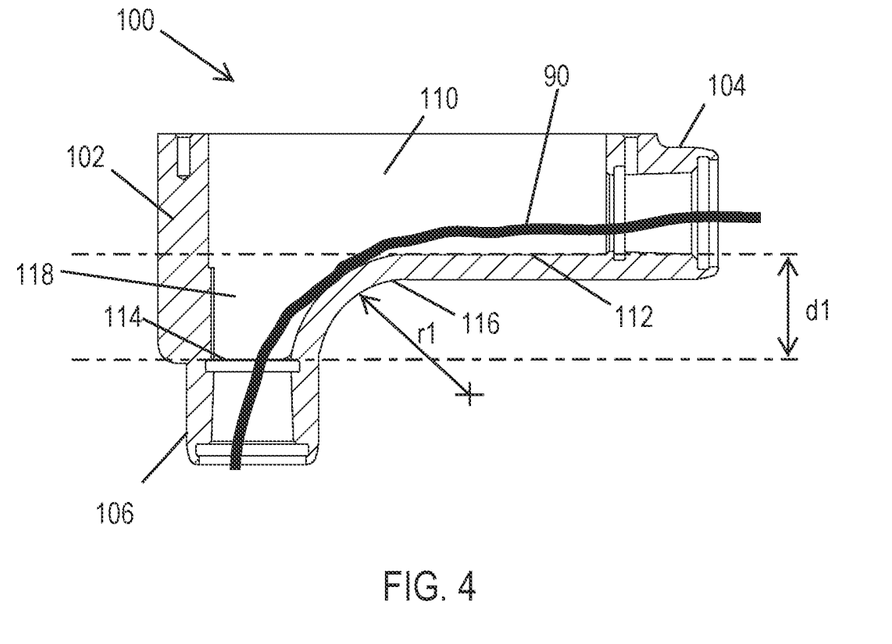
FIG. 4 is a cross-sectional view of the conduit body of FIG. 1, taken along line A-A of FIG. 3.

With continued reference to FIGS. 3 and 4, within the internal chamber 110, the sidewall 102 defines a first surface section 112 adjacent the port 104 and a second surface section 114 adjacent the port 106. The first surface section 112 and the second surface section 114 are arranged on different planes spaced apart by a distance d1. In some embodiments, the distance d1 may be in a range from approximately 1 inch to approximately 2 inches, and in certain embodiments, d1 may be approximately 1.39 inches. The first surface section 112 and the second surface section 114 are connected by a radiused transition section 116. In some embodiments, a radius r1 of the radiused transition section 116 may be in a range from approximately 1 inch to approximately 2 inches, and in certain embodiments, r1 may be approximately 1.19 inches. Note that the exemplary dimensions of d1, d2, d3, d4, r1, r2, r3, and r4 provided herein are reflective only of certain embodiments of the conduit body given a particular trade size. Other embodiments, particularly embodiments for other trade sizes of conduit, may be outside of the disclosed measurements and ranges. A portion 118 of the internal chamber 110 between the planes of the first and second surface sections 112, 114 provides additional volume in which the cable 90 can reside.

The cable 90, when pulled through the conduit body 100, generally drags along the radiused transition section 116, and the cable 90 is forced to bend in order to pass through both ports 104, 106. The force required to bend the cable 90 and the frictional force of the cable 90 against the radiused transition section 116 form a component of the pull force required to install the cable 90. By increasing the distance d1, and consequently the volume of the portion 118, the cable 90 can take on a larger bend radius, which in turn reduces the pulling force required to install the cable 90. Similarly, by increasing the radius r1 of the radiused transition section 116, the frictional drag force on the cable 90 is reduced, which in turn reduces the pulling force required to install the cable 90. Thus, the conduit body 100 of the present disclosure reduces the required cable pulling force when compared to conventional conduit bodies due to the distance d1, the increase in volume of the internal chamber 110 in the portion 118, and the radius r1 of the radiused transition section 116. Therefore, cable installation in the conduit body 100 may require less pulling force than conventional designs, and may allow for more turns in the conduit run.

Figure 5:
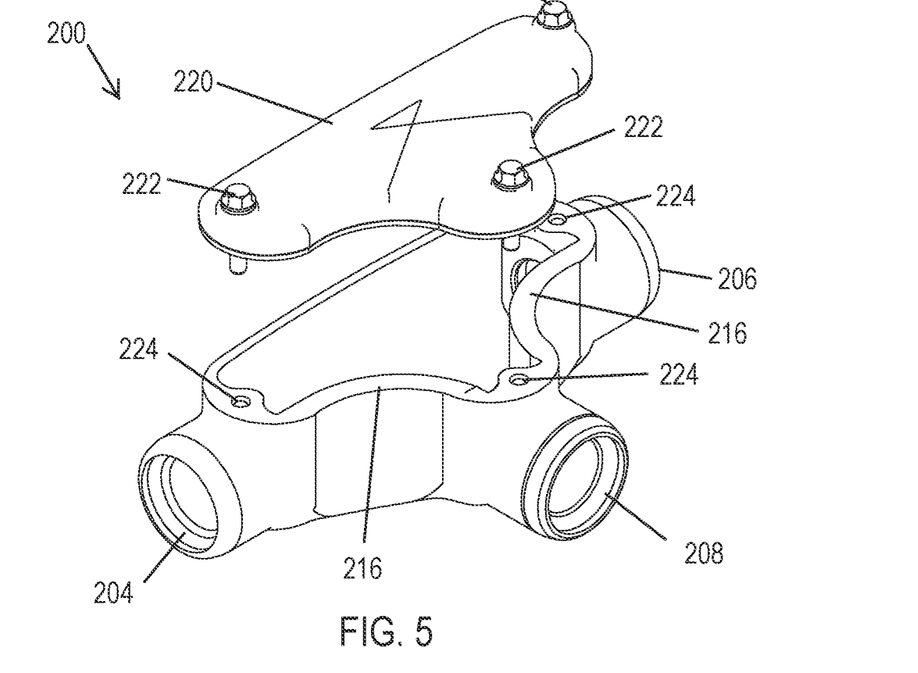
FIG. 5 is an exploded perspective view of a conduit body in accordance with an embodiment of the present disclosure.
Figure 6:
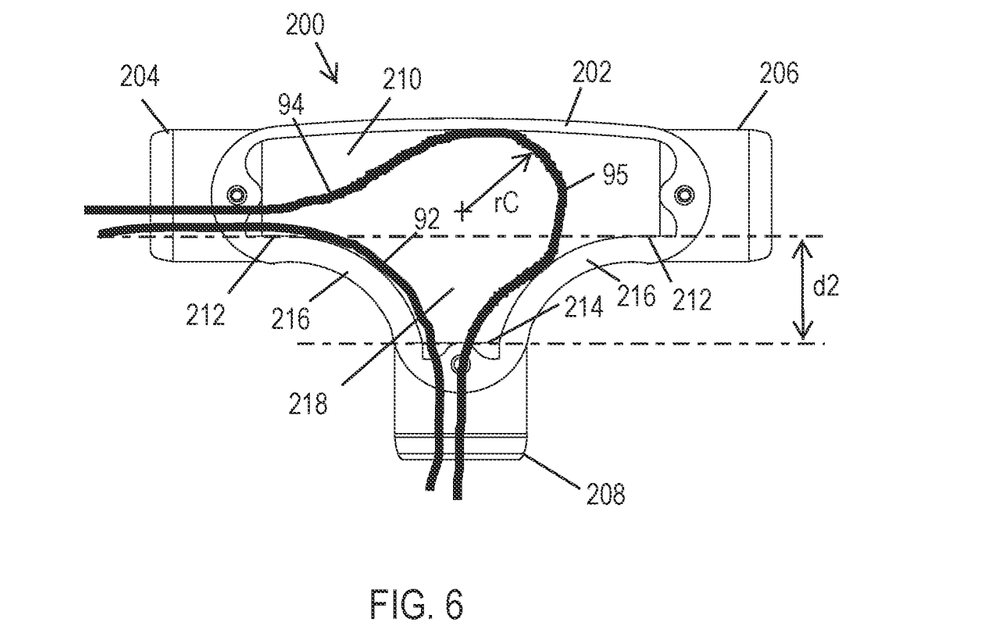
FIG. 6 is a top view of the conduit body of FIG. 5, with a cover thereof removed for clarity.

Referring now to FIGS. 5 and 6, a conduit body 200 is illustrated in accordance with another embodiment of the present disclosure. The conduit body 200 includes a sidewall 202 defining an internal chamber 210 which houses one or more cables 92, 94. The sidewall 202 further defines (or is connected to) three ports 204, 206, 208 which provide access to the internal chamber 210 for the cable 92, 94 to be installed. The ports 204, 206, 208 in the illustrated embodiment are arranged such that ports 204 and 206 are coaxial with one another, and port 208 extends at approximately 90° relative to ports 204 and 206. In other embodiments, the ports 204, 206, 208 could be provided at other angles relative to one another. Each of the ports 204, 206, 208 is configured to receive a conduit through which cable 92, 94 is fed into the internal chamber 110. Each of the ports 204, 206, 208 may include an NPT thread or other industry standard interface for connecting to the conduit.

The conduit body 200 further includes a cover 220 which connects to the sidewall 202 via fasteners 222, e.g. screws, received by threaded holes 224 in the sidewall 202. The cover 220, along with the sidewall 202, encloses the internal chamber 210. The cover 220 is located on a side of the conduit body 200 parallel to a plane extending through all three ports 204, 206, 208. In some embodiments, the cover 220 is secured to the sidewall 202 with three screws 222 and three holes 224, with each of the three holes 224 provided adjacent to one of the ports 204, 206, 208. The use of three screws 222 and holes 224 adjacent to the ports 204, 206, 208 provides a significantly stronger connection of the cover 220 as compared to conventional conduit body designs. In some embodiments, a gasket may be provided between the sidewall 202 and the cover 220 to provide a fluid-tight and/or air-tight seal isolating the internal chamber 210 from the external atmosphere surrounding the conduit body 200.

Within the internal chamber 210, the sidewall 202 defines a first surface section 212 on a plane adjacent the ports 204, 206, The sidewall 202 further defines a second surface section 114 adjacent the port 106. The first surface section 212 and the second surface section 214 are arranged on different planes spaced apart by a distance d2. In some embodiments, the distance d2 may be in a range from approximately 1 inch to approximately 2 inches, and in certain embodiments, d2 may be approximately 1.41 inches. The first surface section 212 and the second surface section 214 are connected by radiused transition sections 216. In some embodiments, a radius r2 of the radiused transition sections 216 may be in a range from approximately 1 inch to approximately 2 inches, and in certain embodiments, r2 may be approximately 1.25 inches. A portion 218 of the internal chamber 210 between the planes of the first and second surface sections 212, 214 provides additional volume in which the cable 92, 94 can reside.

The cable 92, when pulled through the conduit body 200, generally drags along the radiused transition section 216, and the cable 92 is forced to bend in order to pass through both ports 204, 208. The force required to bend the cable 92 and the frictional force of the cable 92 against the radiused transition section 216 form a component of the pull force required to install the cable 92. By increasing the distance d2, and consequently the volume of the portion 218, the cable 92 can take on a larger bend radius, which in turn reduces the pulling force required to install the cable 92. Similarly, by increasing the radius r2 of the radiused transition sections 216, the frictional drag force on the cable 92 is reduced, which in turn reduces the pulling force required to install the cable 92. Thus, the conduit body 200 of the present disclosure reduces the required cable pulling force when compared to conventional conduit bodies due to the distance d2, the increase in volume of the internal chamber 210 in the portion 218, and the radius r2 of the radiused transition sections 216. Therefore, cable installation in the conduit body 200 may require less pulling force than conventional designs, and may allow for more turns in the conduit run.

With continued reference to FIG. 6, cable 94 is illustrated in a position near the end of a pulling operation. That is, the cable 94 has been fed through the port 204 and reinserted through the port 208. The cable 94 naturally forms a loop 95 with a radius rC as the cable 94 is pulled through the port 208. As the leading end of the cable 94 is pulled through the port 208, the radius rC of the loop 95 decreases until the loop 95 is small enough to lay within the confines on the internal chamber 210 in the relaxed position of cable 92. As a tighter radius makes the loop 95 of the cable 94 more difficult to pull, it is advantageous that the internal chamber 210 is large enough that a relatively large radius rC of the cable 94 can be contained in the internal chamber 210. The portion 218 of the internal chamber 210 provides additional volume which the loop 95 can occupy, when compared to conventional conduit bodies. Thus, the conduit body 200 of the present disclosure allows for a relatively larger loop 95, which thereby reduces the pulling force required to install the cable 94, when compared to conventional conduit bodies.

Figure 7:
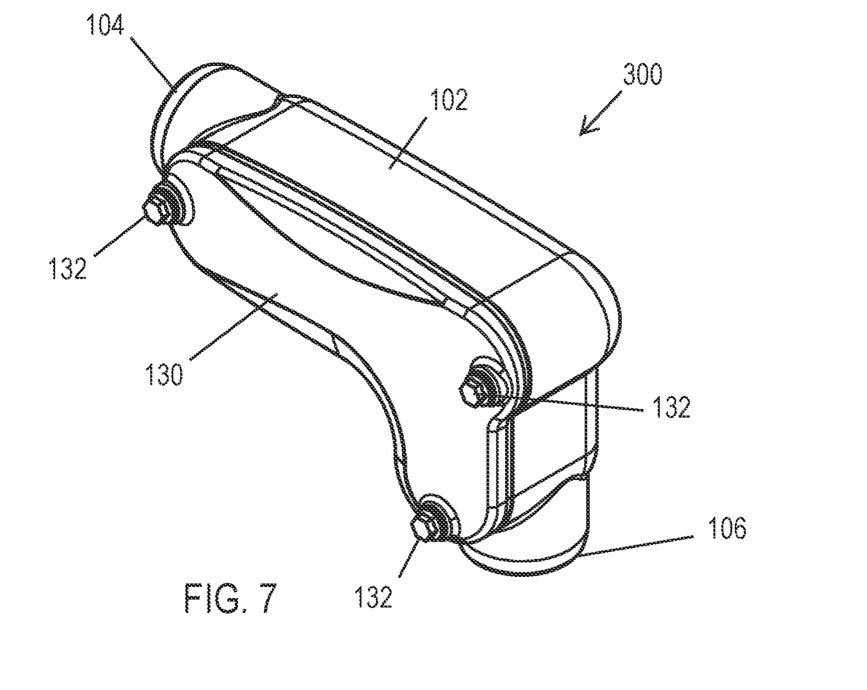
FIG. 7 is a perspective view of a conduit body in accordance with an embodiment of the present disclosure.
Figure 8:
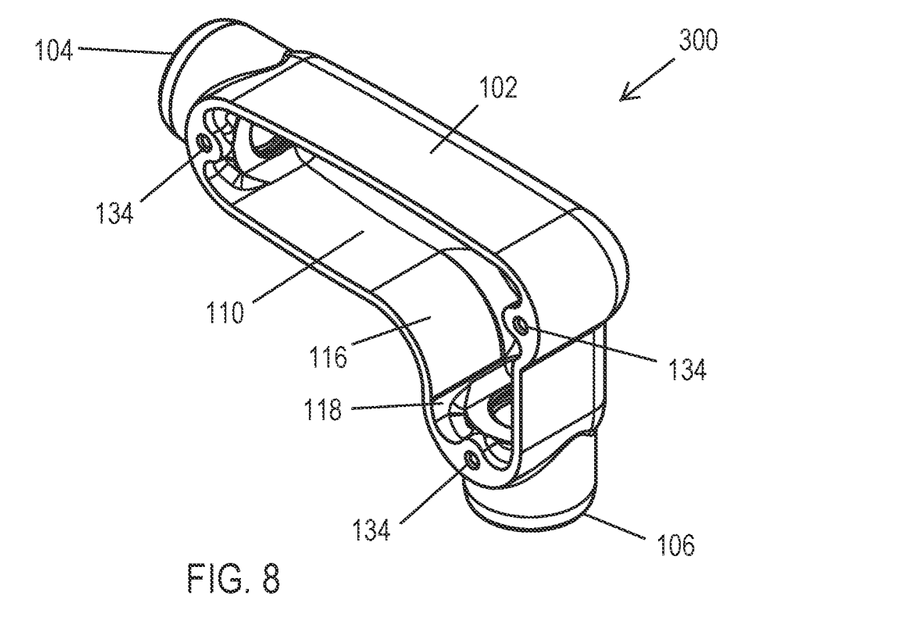
FIG. 8 is a perspective view of the conduit body of FIG. 7, with a cover thereof removed for clarity.
Figure 9:
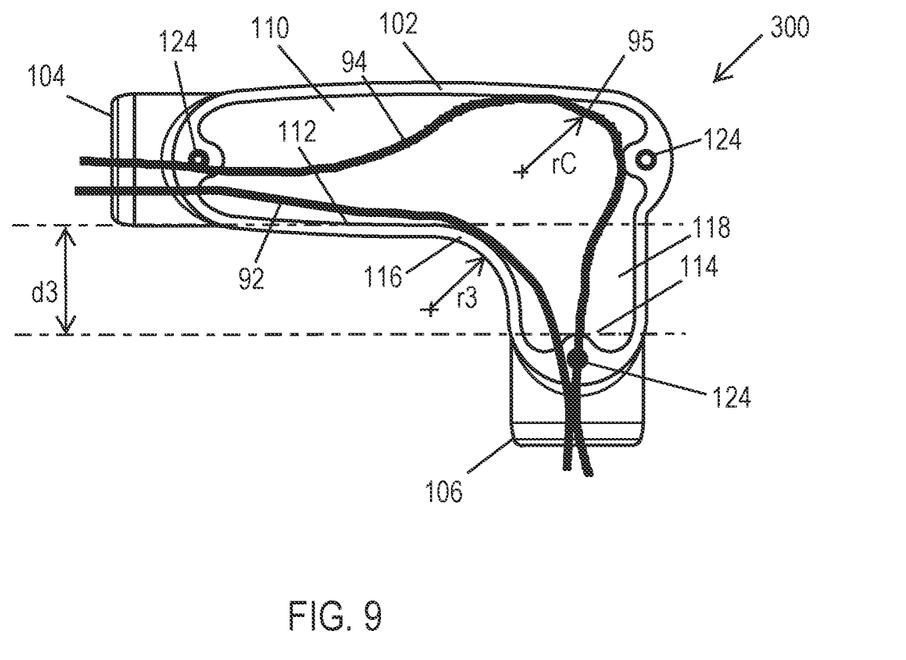
FIG. 9 is a side view of the conduit body of FIG. 7, with the cover thereof removed for clarity.

Referring now to FIGS. 7-9, a conduit body 300 is illustrated in accordance with another embodiment of the present disclosure. The conduit body 300 is similar to the conduit body 100 illustrated in FIGS. 1-4, with the exception that the cover is provided on the side of the conduit body rather than the top of the conduit body. Like the conduit body 100 of FIGS. 1-4, the conduit body 300 includes a sidewall 102 defining an internal chamber 110 which houses one or more cables 92, 94 (see FIG. 9). The sidewall 102 further defines (or is connected to) two ports 104, 106 which provide access to the internal chamber 110 for the cable 92, 94 to be installed. The ports 104, 106 in the illustrated embodiment are arranged at approximately 90° relative to one another, though in other embodiments the ports 104, 106 could be provided at another angle or could be arranged coaxially relative to one another. Each of the ports 104, 106 is configured to receive a conduit through which cable 92, 94 (see FIG. 9) is fed into the internal chamber 110. Each of the ports 104, 106 may include an NPT thread or other industry standard interface for connecting to the conduit.

The conduit body 300 further includes a cover 130 which connects to the sidewall 102 via fasteners 132, e.g. screws, received by threaded holes 134 in the sidewall 102. The cover 130, along with the sidewall 102, encloses the internal chamber 110. The cover 130 is located on a side of the conduit body 300 parallel to a plane extending through both ports 104, 106. The cover 130 is secured to the sidewall 102 with three screws 132 and three holes 134, with two of the three holes 134 provided adjacent to a respective port 104, 106, and the third hole 134 at a corner of the sidewall 102 opposite the ports 104, 106. The use of three screws 132 and holes 134 provides a significantly stronger connection of the cover as compared to conventional conduit body designs. In some embodiments, a gasket may be provided between the sidewall 102 and the cover 130 to provide a fluid-tight and/or air-tight seal isolating the internal chamber 110 from the external atmosphere surrounding the conduit body 100.

With continued reference to FIG. 9, within the internal chamber 110, the sidewall 102 defines a first surface section 112 adjacent the port 104 and a second surface section 114 adjacent the port 106. The first surface section 112 and the second surface section 114 are arranged on different planes spaced apart by a distance d3. In some embodiments, the distance d3 may be in a range from approximately 1 inch to approximately 2 inches, and in certain embodiments, d3 may be approximately 1.45 inches. The first surface section 112 and the second surface section 114 are connected by a radiused transition section 116. In some embodiments, a radius r3 of the radiused transition section 116 may be in a range from approximately 1 inch to approximately 2 inches, and in certain embodiments, r3 may be approximately 1.00 inches. A portion 118 of the internal chamber 110 between the planes of the first and second surface sections 112, 114 provides additional volume in which the cable 92, 94 can reside.

The cable 92, when pulled through the conduit body 300, generally drags along the radiused transition section 116, and the cable 92 is forced to bend in order to pass through both ports 104, 106. The force required to bend the cable 92 and the frictional force of the cable 92 against the radiused transition section 116 form a component of the pull force required to install the cable 92. By increasing the distance d3, and consequently the volume of the portion 118, the cable 92 can take on a larger bend radius, which in turn reduces the pulling force required to install the cable 92. Similarly, by increasing the radius r3 of the radiused transition section 116, the frictional drag force on the cable 92 is reduced, which in turn reduces the pulling force required to install the cable 92. Thus, the conduit body 300 of the present disclosure reduces the required cable pulling force when compared to conventional conduit bodies due to the distance d3, the increase in volume of the internal chamber 110 in the portion 118, and the radius r3 of the radiused transition section 116. Therefore, cable installation in the conduit body 300 may require less pulling force than conventional designs, and may allow for more turns in the conduit run.

With continued reference to FIG. 9, cable 94 is illustrated in a position near the end of a pulling operation. That is, the cable 94 has been fed through the port 104 and reinserted through the port 106. The cable 94 naturally forms a loop 95 with a radius rC as the cable 94 is pulled through the port 106. As the leading end of the cable 94 is pulled through the port 106, the radius rC of the loop 95 decreases until the loop 95 is small enough to lay within the confines on the internal chamber 110 in the relaxed position of cable 92. As a tighter radius makes the loop 95 of the cable 94 more difficult to pull, it is advantageous that the internal chamber 110 is large enough that a relatively large radius rC of the cable 94 can be contained in the internal chamber 110. The portion 118 of the internal chamber 110 provides additional volume which the loop 95 can occupy, when compared to conventional conduit bodies. Thus, the conduit body 300 of the present disclosure allows for a relatively larger loop 95, which thereby reduces the pulling force required to install the cable 94, when compared to conventional conduit bodies.

Figure 10:
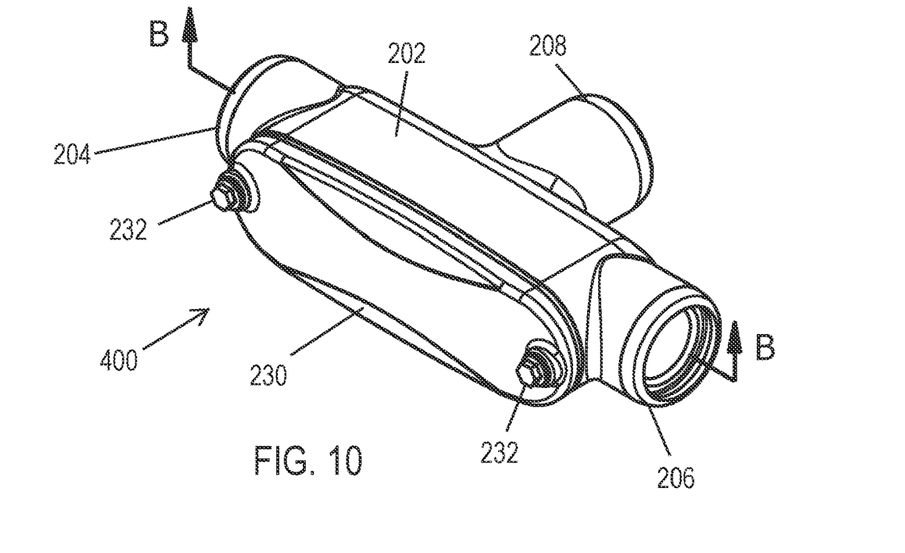
FIG. 10 is a perspective view of a conduit body in accordance with an embodiment of the present disclosure.
Figure 11:
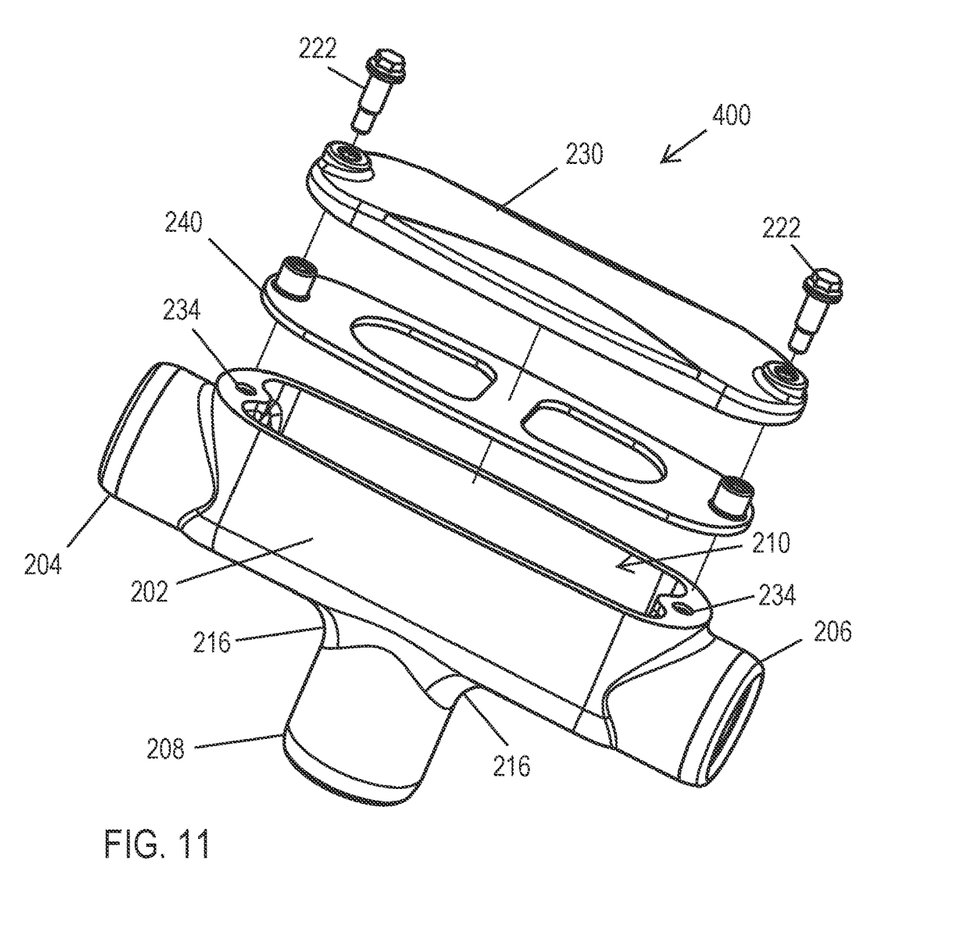
FIG. 11 is an exploded perspective view of the conduit body of FIG. 10.
Figure 12:
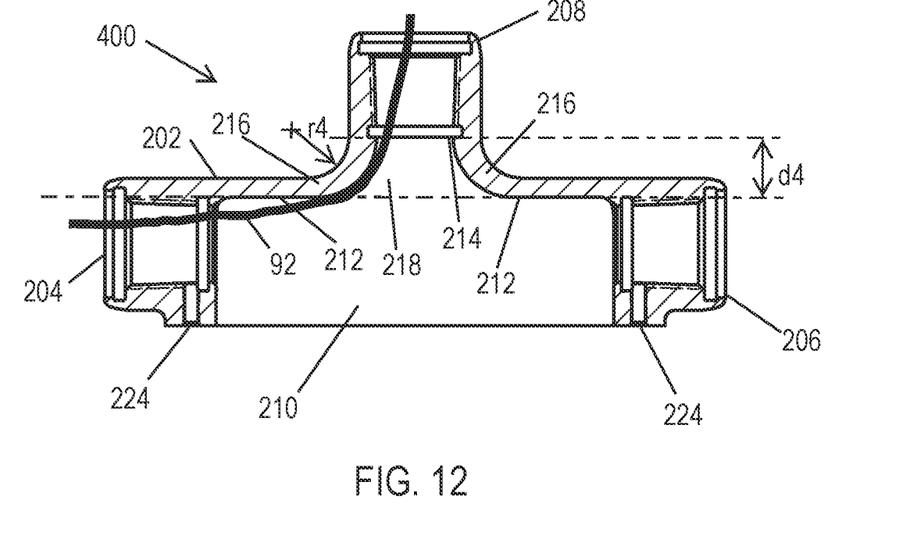
FIG. 12 is a cross-sectional view of the conduit body of FIG. 10, taken along line B-B of FIG. 10.
Figure 13:
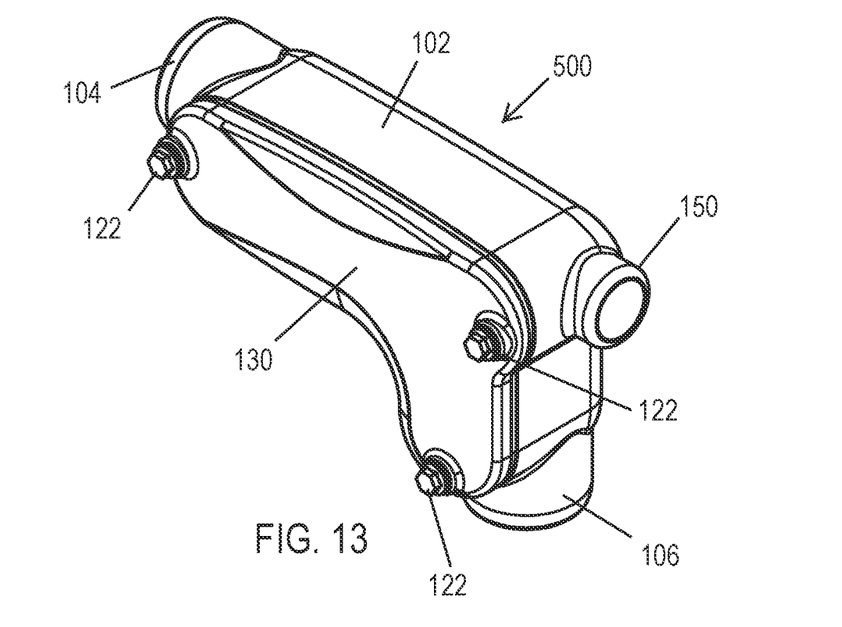
FIG. 13 is a perspective view of a conduit body in accordance with an embodiment of the present disclosure.
Figure 14:
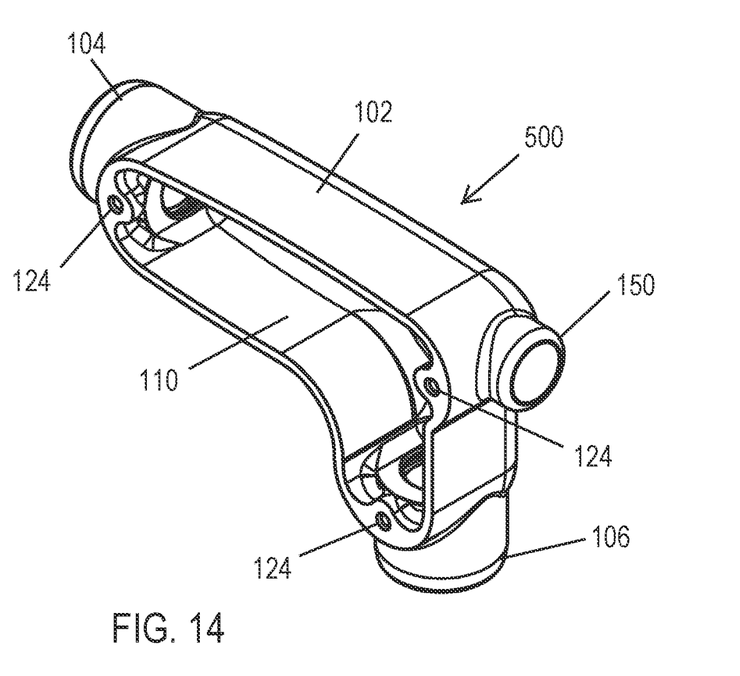
FIG. 14 is a perspective view of the conduit body of FIG. 13, with a cover thereof removed for clarity.
Figure 15:
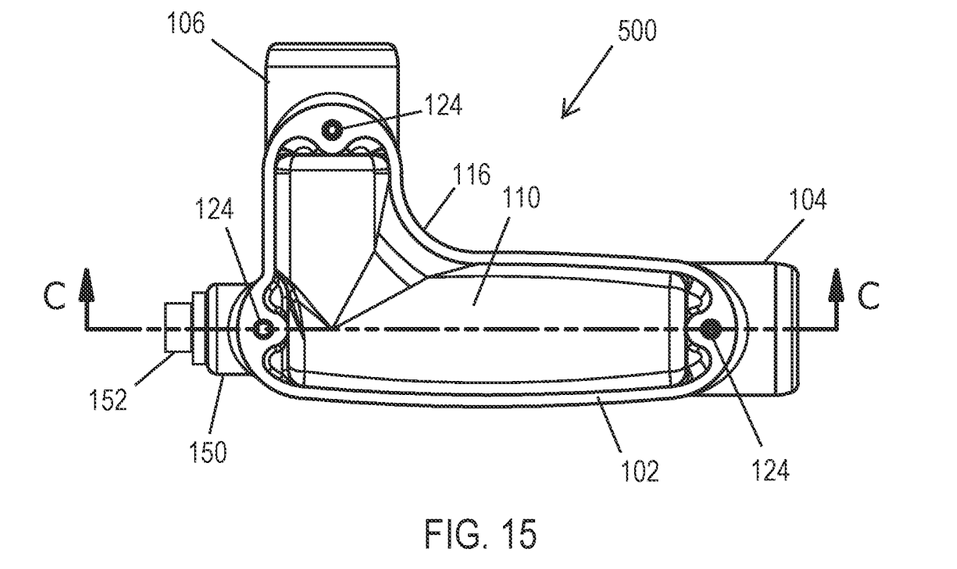
FIG. 15 is a side view of the conduit body of FIG. 13, with a cover thereof removed for clarity.
Figure 16:
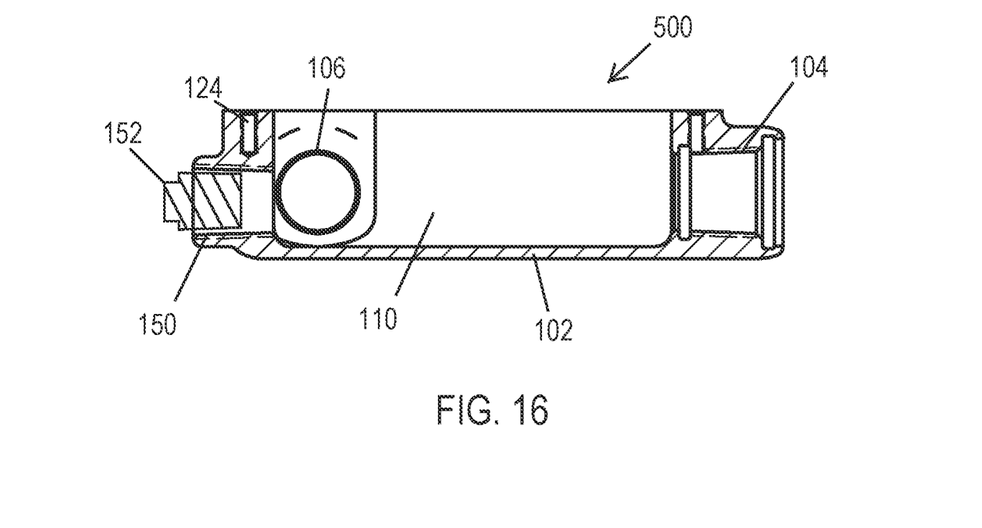
FIG. 16 is a cross-sectional view of the conduit body of FIG. 13, taken along line C-C of FIG. 15.

Referring now to FIGS. 10-12, a conduit body 400 is illustrated in accordance with another embodiment of the present disclosure. Like the conduit body 200 of FIGS. 5 and 6, the conduit body 400 includes a sidewall 202 defining an internal chamber 210 which houses one or more cables 92. The sidewall 202 further defines (or is connected to) three ports 204, 206, 208 which provide access to the internal chamber 210 for the cable 92 to be installed. The ports 204, 206, 208 in the illustrated embodiment are arranged such that ports 204 and 206 are coaxial, and port 208 extends at approximately 90° relative to ports 204 and 206. In other embodiments, the ports 204, 206, 208 could be provided at other angles relative to one another. Each of the ports 204, 206, 208 is configured to receive a conduit through which cable 92 is fed into the internal chamber 110. Each of the ports 204, 206, 208 may include an NPT thread or other industry standard interface for connecting to the conduit.

The conduit body 400 further includes a cover 230 which connects to the sidewall 202 via fasteners 232, e.g. screws, received by threaded holes 234 in the sidewall 202. The cover 230, along with the sidewall 202, encloses the internal chamber 210. The cover 230 is located on an opposite side of the internal chamber 210 relative to the port 208. A gasket 240 may be provided between the sidewall 202 and the cover 230 to provide a fluid-tight and/or air-tight seal isolating the internal chamber 210 from the external atmosphere surrounding the conduit body 400.

Within the internal chamber 210, the sidewall 202 defines a first surface section 212 on a plane adjacent the ports 204, 206, The sidewall 202 further defines a second surface section 214 adjacent the port 106. The first surface section 212 and the second surface section 214 are arranged on different planes spaced apart by a distance d4. In some embodiments, the distance d4 may be in a range from approximately 1 inch to approximately 2 inches, and in certain embodiments, d4 may be approximately 1.45 inches. The first surface section 212 and the second surface section 214 are connected by radiused transition sections 216. In some embodiments, a radius r4 of the radiused transition sections 216 may be in a range from approximately 1 inch to approximately 2 inches, and in certain embodiments, r4 may be approximately 1.25 inches. A portion 218 of the internal chamber 210 between the planes of the first and second surface sections 212, 214 provides additional volume in which the cable 92 can reside.

The cable 92, when pulled through the conduit body 400, generally drags along the radiused transition section 216, and the cable 92 is forced to bend in order to pass through both ports 204, 208. The force required to bend the cable 92 and the frictional force of the cable 92 against the radiused transition section 216 form a component of the pull force required to install the cable 92. By increasing the distance d4, and consequently the volume of the portion 218, the cable 92 can take on a larger bend radius, which in turn reduces the pulling force required to install the cable 92. Similarly, by increasing the radius r4 of the radiused transition sections 216, the frictional drag force on the cable 92 is reduced, which in turn reduces the pulling force required to install the cable 92. Thus, the conduit body 200 of the present disclosure reduces the required cable pulling force when compared to conventional conduit bodies due to the distance d4, the increase in volume of the internal chamber 210 in the portion 218, and the radius r4 of the radiused transition sections 216. Therefore, cable installation in the conduit body 400 may require less pulling force than conventional designs, and may allow for more turns in the conduit run.

Referring now to FIGS. 13-16, a conduit body 500 is illustrated in accordance with another embodiment of the present disclosure. The conduit body 500 is similar to the conduit body 300 illustrated in FIGS. 7-9, but includes a drain port 150 in the sidewall 102. The drain port 150 is in fluid communication with the internal chamber 110 and provides a path for water to flow out of the internal chamber 110. The conduit body 500 is typically installed with the drain port 150 facing downward so that gravity induces any water in the internal chamber 110 to flow toward the drain port 150. The drain port 150 is located at a lowest point of the internal chamber 110 so that substantially all liquid in the internal chamber 110 can flow out of the drain port 150. Further, the conduit body 500 may be installed at a lowest position within a conduit run (or the lowest position in a particular section of a conduit run) so that water in connected components (e.g. conduit, fittings, and/or other conduit bodies) flows into the conduit body 500 and toward the drain port 150.

The drain port 150 is adjacent to the port 106 and oriented approximately perpendicular to the port 106 in the illustrated embodiment, though other positions of the drain port 150 are also possible. The drain port 150 may include an NPT thread or other interface for connection to a drain fitting 152 (e.g. a plug, valve, or the like) that can be opened to drain the internal chamber 110.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A conduit body comprising:
a sidewall defining an internal chamber and at least two ports providing access to the internal chamber; and
a cover connectable to the sidewall to enclose the internal chamber, wherein the sidewall defines:
a first surface section adjacent one of the at least two ports;
a second surface section adjacent another of the at least two ports with the first surface section and the second surface section are arranged on different planes spaced apart by a distance d; and
a radiused transition section having a radius r connecting the first surface section and the second surface section, wherein the first surface section is spaced apart from the second surface section by the distance d to increase a volume of the internal chamber, and
the distance d, the increase in volume of the internal chamber, and the radius r of the radiused transition section are configured for reducing frictional drag of a cable pulled through the internal chamber,
wherein the cover is located on a side of the conduit body parallel to a plane extending through the at least two ports with at least one of the at least two ports being arranged at approximately 90° relative to another one of the at least two ports.

2. The conduit body of claim 1, wherein the distance d between the first surface section and the second surface section dictates a bend radius of the cable in the internal chamber.

3. The conduit body of claim 1, further comprising a gasket between the sidewall and the cover.

4. The conduit body of claim 1, wherein the at least two ports are arranged at approximately 90° relative to one another.

5. The conduit body of claim 1, further comprising a drain port in fluid communication with the internal chamber.

6. The conduit body of claim 5, further comprising a drain fitting connected to the drain port.

7. The conduit body of claim 6, wherein the drain fitting comprises a plug or a valve.

8. The conduit body of claim 6, wherein the drain port is oriented approximately perpendicular to one of the at least two ports.

9. The conduit body of claim 6, wherein the drain port is located at a lowest point of the internal chamber.

10. The conduit body of claim 1, wherein the cover is connectable to the sidewall by three fasteners.

11. The conduit body of claim 10, wherein each of the three fasteners is adjacent to one of the ports.

12. The conduit body of claim 1, wherein the at least two ports comprise three ports.

13. The conduit body of claim 12, wherein two of the three ports are coaxial to one another, and a third of the three ports extends at approximately 90° relative to the other two ports.

14. The conduit body of claim 1, wherein the distance d is in a range of a inches to b inches and the radius r is in a range of y inches to z inches where a=y and b=z.

15. The conduit body of claim 14, wherein a and y are approximately 1 inch and b and z are approximately 2 inches.

* * * * *